US010719352B2

(12) United States Patent
Bacher et al.

(10) Patent No.: US 10,719,352 B2
(45) Date of Patent: Jul. 21, 2020

(54) SYSTEM AND METHOD FOR IN-PROCESS NAMESPACE SWITCHING

(71) Applicant: International Business Machines Corporation, Armonk, NY (US)

(72) Inventors: Utz Bacher, Dettenhausen (DE);
Dominik Dingel, Hamburg (DE);
Karsten Graul, Schlaitdorf (DE);
Michael Holzheu, Tübingen (DE);
Rene Trumpp, Langenau (DE)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 15/877,045

(22) Filed: Jan. 22, 2018

(65) Prior Publication Data
US 2019/0227840 A1    Jul. 25, 2019

(51) Int. Cl.
*G06F 9/455*    (2018.01)
*G06F 9/48*    (2006.01)
*H04L 12/24*    (2006.01)

(52) U.S. Cl.
CPC ........ *G06F 9/4856* (2013.01); *G06F 9/45558* (2013.01); *G06F 9/4812* (2013.01); *H04L 41/0806* (2013.01); *H04L 41/0886* (2013.01); *H04L 41/0893* (2013.01); *H04L 41/5058* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,458,696 B2* | 6/2013 | Park | G06F 9/455 711/165 |
| 9,092,235 B2* | 7/2015 | Agarwal | G06F 9/455 |
| 9,811,364 B2* | 11/2017 | Jacobson | G06F 9/45558 |
| 2007/0245334 A1 | 10/2007 | Nieh et al. | |
| 2016/0299851 A1 | 10/2016 | Mattson, Jr. et al. | |
| 2017/0098072 A1* | 4/2017 | Stopel | G06F 21/554 |
| 2017/0111241 A1 | 4/2017 | Degioanni | |

FOREIGN PATENT DOCUMENTS

CN    105897946 A    8/2016

* cited by examiner

*Primary Examiner* — Bing Zhao
(74) *Attorney, Agent, or Firm* — Patterson + Sheridan, LLP

(57) ABSTRACT

A system and method for sharing services provides for generating one or more trigger conditions associated with a process executable in a source container having a source namespace in a source pod, executing the process in the source container, and when a trigger condition occurs, interrupting the executed process and moving the process into a target pod by switching from the source namespace of the source container to a target namespace of the target pod. The trigger condition may be associated with a service executable in a target container having the target namespace in the target pod.

23 Claims, 3 Drawing Sheets

SYSTEM AND METHOD FOR IN-PROCESS NAMESPACE SWITCHING

FIELD OF THE INVENTION

Certain embodiments of the invention relate to the field of digital computer systems and methods. More specifically, certain embodiments of the invention relate providing communication between containers running in different pods on an operating system which share a service, and the methods therein.

BACKGROUND OF THE INVENTION

Conventional container technology uses so-called namespaces, a resource scoping mechanism that provides a level of isolation against neighbor containers. Collaboration of containers happens through well-defined interfaces. For example, each container can offer an interface, like a REST API, for providing services.

Today's application environments tend to use containers and microservices as an architectural paradigm. In that scheme, a particular selection of microservices running as containers are grouped together in a pod, thereby forming, for example, an application or solution. Communication between these containers running as a group in a pod is thus optimized through co-location, such that no physical network traffic is used.

One of the most popular container orchestration projects, kubernetes, uses a grouping mechanism to place interacting services next to each other. Technically, using container co-location allows for maximum efficiency in communication. To achieve this, namespaces can be shared across containers. That is, communication between two containers with shared namespaces is very much more efficient than without namespace sharing, e.g., shared namespaces allow for loopback communication, which is significantly more efficient than using the default container networking communication infrastructure, which employs virtual switches.

However, if a container running in a first pod with a first namespace requires the services of a second container running in a second pod with a second namespace, or in other words, if the services of the second container are to be shared between the two pods with different namespaces (i.e., no namespace sharing between these two containers), the two containers are not co-located and communication between the two containers requires logical or even physical network traffic, governed for example, by TCP/IP. Although using network traffic via TCP/IP to enable shared services between two pods may be used, this solution does not leverage intra-pod communication for optimizing communication.

One solution is to break up the shared service, such that an instance of the service is run in each pod, however this solution also requires changes in application breakdown, which is difficult to implement.

BRIEF SUMMARY OF THE INVENTION

Various embodiments provide a method for sharing a service between processes of containers running in different pods on an operating system, and a computer program product and a computer system as described by the subject matter of the independent claims. Advantageous embodiments are described in the dependent claims. Embodiments of the present invention can be freely combined with each other if they are not mutually exclusive.

In one aspect, the invention relates to a computer implemented method for sharing services, the method comprising generating one or more trigger conditions associated with a process executable in a first container having a source namespace in a source pod, executing the process in the first container, and when a trigger condition occurs, where the trigger condition is associated with a service executable in a second container having a target namespace in a target pod, interrupting the executed process and moving the process into the target pod by switching the source namespace of the first container to the target namespace.

In another aspect, the invention relates to an operating system for sharing services, the operating system comprising an operating system kernel, a source pod comprising a first container having a source namespace, a target pod comprising a second container having a target namespace, and a name space switch manager, NSSM, wherein the operating system kernel is configured to configure the NSSM with one or more trigger conditions associated with a process executable in the first container and execute the process in the first container, and wherein the NSSM is configured to configure a second kernel thread for notifying the NSSM when a trigger condition occurs, wherein the trigger condition is associated with a service executable in the second container, and interrupt the executed process when the trigger condition occurs, and wherein the NSSM is further configured to move the process into the target pod by switching the source namespace of the first container to the target namespace.

BRIEF DESCRIPTION OF SEVERAL VIEWS OF THE DRAWINGS

The following embodiments of the invention are explained in greater detail, by way of example only, making reference to the drawings in which.

DETAILED DESCRIPTION OF THE INVENTION

Figure 1:
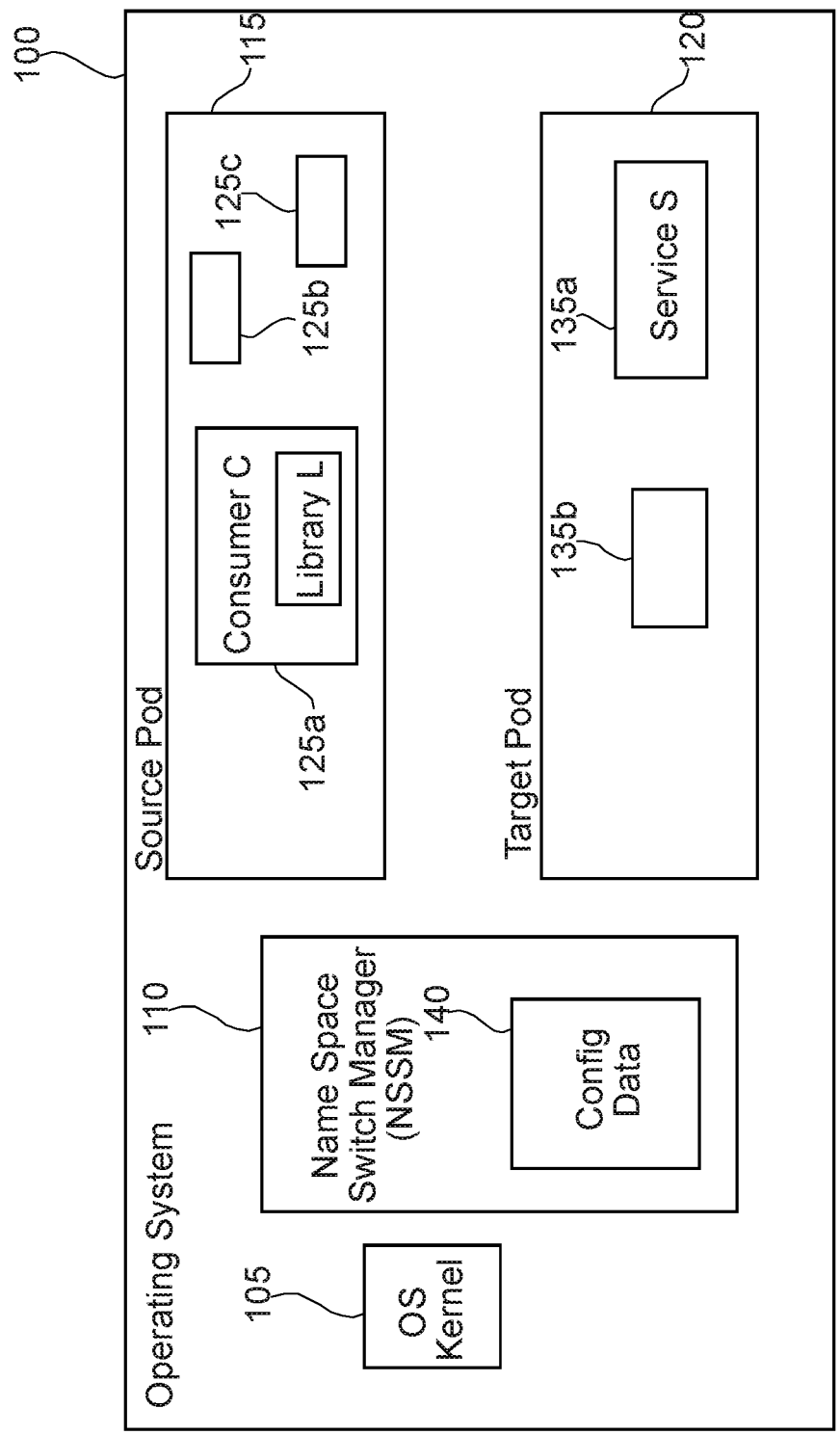
FIG. 1 is a schematic diagram of an operating system, according to an embodiment of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments of the invention enable efficient communication between processes running on an operating system, using the concept of shared service. To achieve shared services, the concept of moving containers between namespaces is introduced. That is, a container may be moved into the namespace of a container running a service to be shared, issue a request or otherwise initiate the service, and upon completion of the service, be moved back to its original namespace. While in the service container namespace, communication between the containers (i.e., between the processes running in the containers) is more efficient. When the container is moved back to its original namespace, the processes in the containers in the different namespaces are operationally more isolated from each other.

A container provides a mechanism to isolate applications, and in particular, isolate processes of applications which run on a system under a variety of operating systems, such as Linux or Unix, for example.

More particular, containers may be formed as part of a scoping mechanism of an operating system via application of namespaces. For example, a process of a container assigned a given namespace does not see other applications, processes or files running on the system having differently assigned namespaces to their respective containers. Thus, a process of a container with a first namespace does not know the existence of a second process of a second container with a different namespace, thereby isolating the two processes from each other in the sense that one process cannot interfere or kill the other process, for example.

There are different types of namespaces, such as, but not inclusively including, process ID namespaces applied to processes, network namespaces applied to network interfaces, an IPC namespace for inter-process communication, and a mount-namespace for sharing filesystem-mounts.

A pod is a set of containers which share a namespace. A computer system may configure a plurality of pods, in order to more effectively use a system's resources, where each pod comprises a set of containers sharing the same namespace. However, it is not practical for all applications and processes to be grouped together under one namespace.

Sharing a service between different containers having different namespaces in different pods may comprise generating one or more trigger conditions associated with a process executable in a first container having a source namespace in a source pod, executing the process in the first container, and when a trigger condition occurs, where the trigger condition is associated with a service executable in a second container having a target namespace in a target pod, interrupting the executed process and moving the process into the target pod by switching the source namespace of the first container to the target namespace.

The above features have the advantage of enabling more efficient communication between a process running in a container with a given namespace which requires the services of a service executable in a container with a different namespace, by effectively moving the container with the given namespace to the namespace of the container of the service, achieved by switching the given namespace of the first container to the different namespace. The present method may have the advantage of eliminating TCP/IP socket based communication between containers with different namespaces by co-locating the two containers via namespace switching.

According to one embodiment, the trigger condition comprises entering a given routine of the process of the container, such as a library routine which is linked to a service executable in another container having a different namespace. These features may have the advantage of operationally isolating the process and the service from each other for a maximum amount of time, (i.e., until the executing process actually requires access to the service, at which time the process and the service are no longer isolated from each other, but at which time efficient communication between the process and the service is enabled).

According to one embodiment, a second trigger condition is generated, wherein the second trigger condition is associated with the service, and the interrupted executed process is continued (i.e., re-started). These features may have the advantage of identifying specific second trigger conditions associated with the service, such as trigger conditions related to any of the instruction steps of which the second service comprises, before the interrupted process is re-started, so as to provide any type of second trigger condition associated with the service, including the feature of exiting the service, before the service is executed by a call or direct jump from the re-started interrupted process.

According to one embodiment, when the second trigger condition occurs, the continued executed process is interrupted, and the process is effectively moved back into the source pod by switching the target namespace of the first container to the source namespace. These features may have the advantage of using a second trigger condition, which is associated with the service, as the condition which effectively moves the container, or in other words, the process in the container, back to the source namespace, thereby effectively providing more operational isolation between the process and the service after the process no longer requires the services of the service.

FIG. 1 is a schematic diagram of an operating system 100, according to an example embodiment of the invention. In one embodiment of the invention, the operating system 100 may comprise, for example, Unix-like operating systems, e.g., Solaris, Linux, or Amiga operating systems, and in other embodiments of the invention, the operating system may comprise a 16-bit version of Microsoft Windows or 32-bit versions of Windows NT or Win9x. The present invention is not limited to the type of operating system.

The operating system 100 comprises an operating system (OS) kernel 105, a Name Space Switch Manager (NSSM) 110, a source pod 115, and a target pod 120. The source pod 115 includes source containers 125. For ease of illustration, FIG. 1 depicts source pod 115 comprising three source containers, but source pod 115 can comprise any number of source containers, including only one source container. In one embodiment of the invention, a process runs in each of the source containers. For example, in source container 125a, a process (not shown) running in (i.e., defined by) the source container 125a includes a library L 130 routine, also referred to as a library L process or sub-process.

The target pod 120 includes target containers 135. For ease of illustration, FIG. 1 depicts target pod 120 comprising two target containers, but target pod 120 can comprise any number of target containers, including only one target container. In one embodiment of the invention, a process runs in each of the target containers. For example, a service S process runs in (i.e., defined by) the target container 135a.

In addition, the source pod 115 has a corresponding source namespace (not shown) and the target pod 120 has a corresponding target namespace (not shown). More precisely, each of the source containers 125 share the source namespace and each of the target containers 135 share the target namespace.

In one embodiment of the invention, the OS kernel 105 executes a process to run in the source container 125a. During execution, the process calls or otherwise enters the library L 130. In this exemplary embodiment, the library L 130 may require access to the service S process, which is only executable in the target container 135a of the target pod 120. In one embodiment, the NSSM 110, upon notification that the process running in the source container 125a calls or enters the library L 130, interrupts the executed process, or in another embodiment, instructs the OS kernel 105 to interrupt the executed process, and the NSSM 110 then switches the namespace of the source container 125*a* from the source namespace to the target namespace, thereby enabling the source container 125*a* and the target container 135*a* to be co-located, which provides for more efficient communication between the library L 130 process and the service S process.

In one embodiment of the invention, the OS kernel 105 configures the NSSM 110 with one or more trigger conditions associated with the process executable in a first container. For example, a trigger condition may be when the process, while being executed in the source container 125*a* in the source pod 115, calls or otherwise enters a subroutine or a library, such as the library L 130, which is linked to another service or process executable in another pod, such as the service S executable in the container 135*a* of the target pod 120. A link may be, for example, a call or a direct transfer from a process executable in a container of a first pod to a process executable in another container of a second pod. Another trigger condition may be when the library L 130 calls a service or a process or directly enters a service or a process which is only executable in a container of another pod, such as the service S executable in the container 135*a* of the target pod 120. The scope of the present invention covers all types of trigger conditions which may be related to calls to processes or instruction steps of processes.

In another embodiment, the OS kernel 105 may optionally, upon loading or designating a process to a particular container, such as the source container 125*a*, generate a configuration data file 140 to be accessed by the NSSM 110 or configure the NSSM 110 with the generated configuration data file 140, where the configuration data file 140 comprises information pertinent to the NSSM 110 switching namespaces of a container. Such information may include, but is not limited, to one or more of identification of processes in containers, trigger conditions of the respective processes, and source and/or target namespaces.

In another embodiment of the invention, the NSSM 110 is configured to interrupt the executed process in the source container 125*a*, or in still another embodiment, instructs the OS kernel 105 to interrupt the executed process in the source container 125*a*, when a trigger condition occurs (e.g., upon notification that the process running in the source container 125*a* calls or enters the library L 130).

In yet another embodiment, the NSSM 110 may configure a second kernel thread (not shown), of the operating system, for example, for notifying the NSSM 110 when a trigger condition occurs, and then the NSSM 110 may interrupt an executed process when notified, and move the process, or in other words, the container comprising the process, into the target pod 120 by switching the source namespace of the first container to the target namespace.

Figure 2:
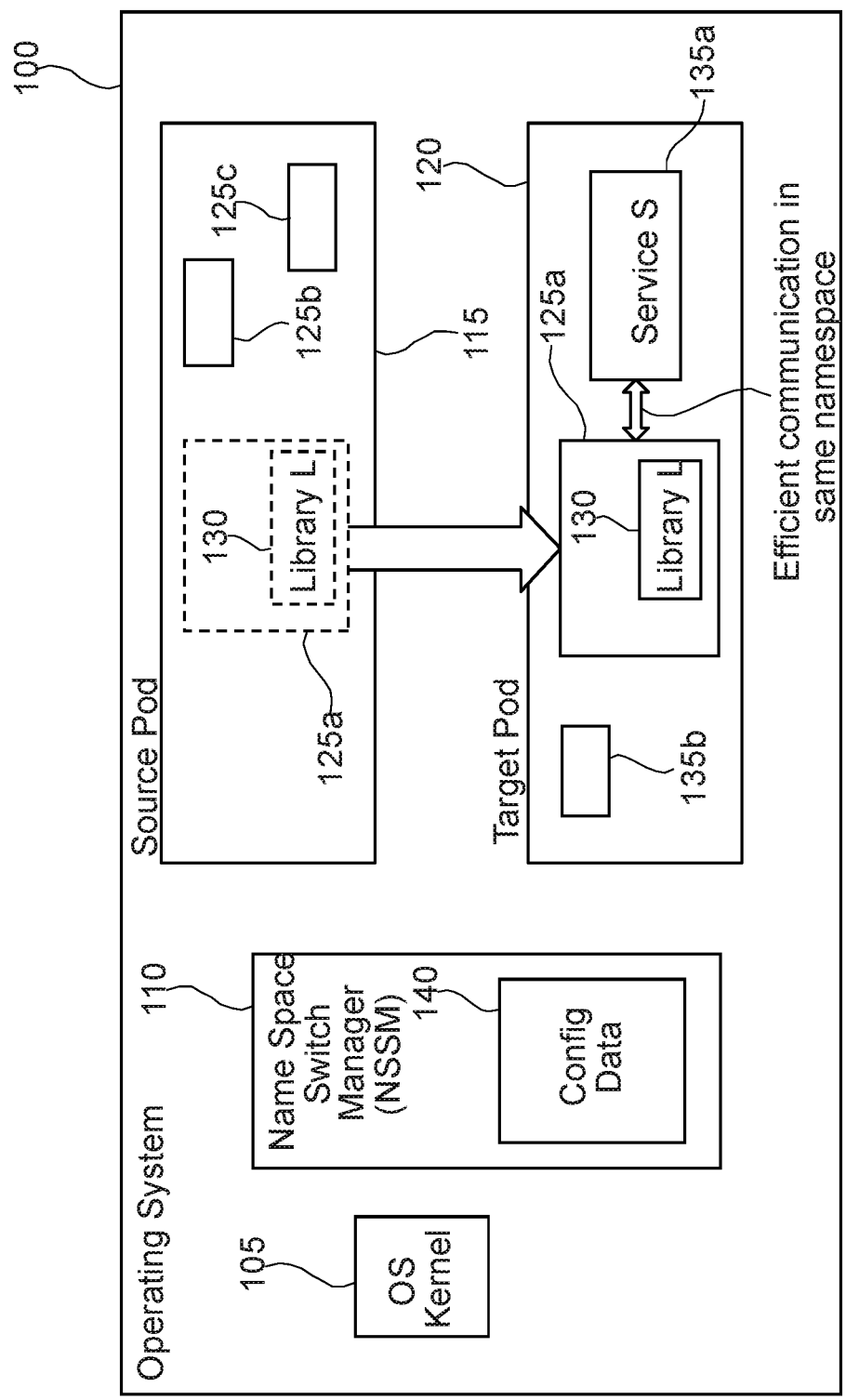
FIG. 2 is a schematic diagram of the operating system of FIG. 1, according to another embodiment of the invention.

FIG. 2 is a schematic diagram of the operating system 100 of FIG. 1, according to another example embodiment of the invention. FIG. 2 represents the state of the operating system 100 after the NSSM 110 has moved the process, or in other words, the process initially executed in the source container 125*a* located in the first pod 115, into the target pod 120 by switching the source namespace of the source container to the target namespace. As illustrated, the source container 125*a* is now co-located with the target container 135*a* in the target pod 120, thereby enabling efficient communication or exchange of data between the process executing in the source container, or more specifically the library L 130 of the process executing in the source container, and the service S which is executing or which will be executed in the target container 135.

Once the NSSM 110 has been notified that a trigger condition has occurred, the NSSM 110 interrupts the executed process in the source container 125*a*, and as illustrated by FIG. 2, switches the source namespace of the source container 125*a* to the target namespace, thereby effectively moving the process initially executed in the source container 125*a* in the source pod 115 into the target pod 120. In another embodiment of the invention, the NSSM 110 may configure a third kernel thread (not shown) of the operating system 100 for notifying the NSSM 110 when a second trigger condition occurs, and the NSSM 110 may then allow the operating system kernel 105 to continue (i.e., re-start) said interrupted executed process in the source container 125*a*, where the source container 125*a* now has the target namespace.

The scope of the present invention covers all types of second trigger conditions, including but not limited to, for example, any type of instruction steps associated with the execution of the service S of container 135*a*, such as exiting the service S. In a further embodiment of the invention, the continued execution of the interrupted process in the source container 125*a*, initiated for example, by the OS kernel 105, may then provide the instructions to either the OS kernel 105 or the NSSM 110 to execute (i.e., initiate) the service S process in the target container 135*a*.

In another embodiment of the invention, the NSSM 110, or a kernel of the OS in an alternate embodiment, may interrupt the process being executed in the source container 125*a* having the target namespace when the second trigger condition occurs, and then may effectively move the process back into the source pod 115 by switching the namespace of the source container 125*a* back to the source namespace. In a further embodiment, the NSSM 10 may then allow the OS kernel 105 to restart the interrupted execution of the process in the first container 125*a* now having the source namespace.

Figure 3:
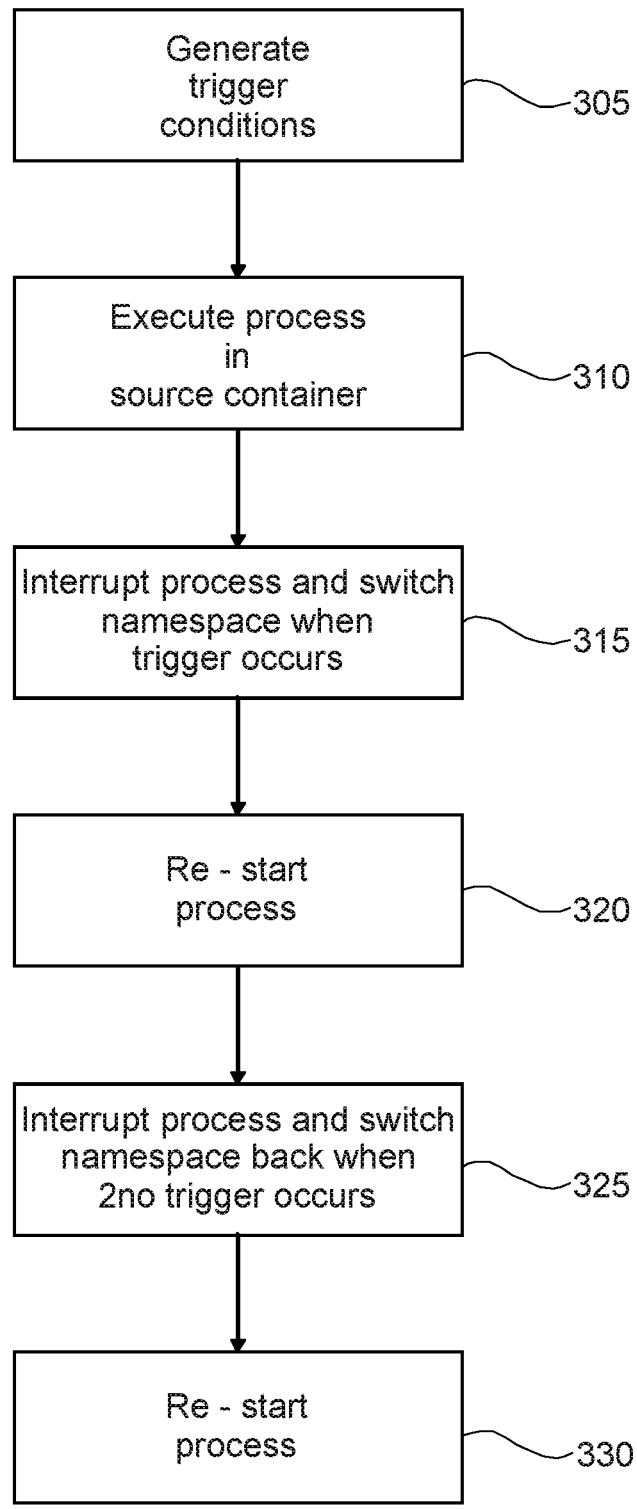
FIG. 3 is a flowchart of a method for sharing services, according to an embodiment of the invention.

FIG. 3 is a flowchart of a method for sharing services, according to an exemplary embodiment of the invention. Sharing of services may be enabled, for example, by one or more elements of the operating system 100 illustrated in FIGS. 1 and 2.

In step 305, one or more trigger conditions associated with a process executable in a source container 125*a* having a source namespace in a source pod 115 are generated. In one embodiment of the invention, an operating system kernel 105 generates the trigger conditions, based upon the executable process, such as process instructions, including entering library processes, such as library L 130 of the process of the source container 125*a* which require calls or direct jumps to subroutines, sub-processes, functions, or services executable in other pods having different namespaces or in other containers in other pods having different namespaces, such as service S executable in the target container 135*a* having the target namespace located in the target pod 120. In another embodiment, the OS kernel 105 configures a NSSM 110 with the generated triggered conditions.

In yet another embodiment of the invention, the OS kernel 105 may optionally, upon loading or designating a process to a particular container, such as the source container 125*a*, generate a configuration data file 140 to be accessed by the NSSM 110 or configure the NSSM 110 with the generated configuration data file 140, where the configuration data file 140 comprises information pertinent to the NSSM 110 switching namespaces of a container. Such information may include, but is not limited, to one or more of an identification of processes in containers, trigger conditions of the respective processes, and source and/or target namespaces.

In step 310, the process in the source container 125a is executed. In one embodiment of the invention, the OS kernel 105 initiates execution of the process in the source container 125a located in the source pod 115.

In step 315, when a trigger condition associated with the executed process occurs, the executed process is interrupted and the source namespace of the source container 125a is switched to the target namespace, thereby effectively moving the source container 125a, and thus the process executable in the source container, to the target pod 120 having the target namespace. In one embodiment of the invention, the NSSM 110 receives notification that a trigger condition has occurred, and then switches the source namespace of the source container 125a to the target namespace. In a further embodiment of the invention, the NSSM 110 may configure a second kernel thread of the operating system 100 to notify the NSSM 110 when one or more trigger conditions occur.

In step 320, the interrupted process in the first container 125a with the target namespace, now effectively located in the target pod 120, is re-started (i.e., execution of the interrupted process is initiated). In one embodiment, the NSSM 110 allows the OS kernel 105 to continue (i.e., re-start) the interrupted process. In an optional embodiment, the NSSM 110 may configure a third kernel thread of the operating system 100 to notify the NSSM 110 when a second trigger condition occurs. In one embodiment, the second trigger condition is based upon the executable process of the target container 135a in the target pod, such as process instructions of the service S, including exiting the service S.

In step 325, when the second trigger condition occurs, the process being executed in the source container 125a having the target namespace is interrupted and the target namespace of the source container 125a is switched to the source namespace, thereby effectively moving the source container 125a, and thus the process executable in the source container 125a, back to the source pod 115 having the source namespace. In one embodiment of the invention, the NSSM 110 receives notification that the second trigger condition has occurred, and then switches the target namespace of the source container 125a to the source namespace.

By effectively moving the source container 125a, and thus the process executable in the source container 125a, back to the source pod 115 having the source namespace, the method thereby enables isolation between any further processes defined by the containers running in the target pod 120 and the process running in the source container 125a in the source pod 115. Process isolation typically means that a process running in a container of a given pod will have limited knowledge about other processes running in containers in other pods, and may also have limited knowledge about other files and architecture of the operating system 100, thereby providing an additional level of security.

In step 330, the interrupted process in the first container 125a with the source namespace, now effectively located in the source pod 115, is re-started (i.e., execution of the interrupted process is initiated). In one embodiment, the NSSM 110 allows the OS kernel 105 to continue (i.e., re-start) the interrupted process.

The operating system 100 may be implemented as any combination of software, hardware and/or firmware, and may be a component of any conventional computer system (not shown), implemented as, but not limited to, for example, a laptop computer, a smart phone, a smart watch, a mainframe computer and a personal digital assistant. The components of computer system may include, but are not limited to, one or more processors or processing units, a storage system, a memory unit, and a bus that couples various system components including memory unit to processor. Storage system may include for example a hard disk drive (HDD). Memory unit may include computer system readable media in the form of volatile memory, such as random access memory (RAM) and/or cache memory.

Computer system typically includes a variety of computer system readable media. Such media may be any available media that is accessible by computer system, and it includes both volatile and non-volatile media, removable and non-removable media.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for sharing services, comprising:
generating, by an operating system kernel, one or more trigger conditions associated with a process executable in a source container having a source namespace in a source pod;
configuring, by the operating system kernel, a name space switch manager (NSSM) with the one or more trigger conditions;
executing said process in said source container; and
configuring, by the NSSM, a second kernel thread for notifying the NSSM when a trigger condition of said one or more trigger conditions occurs, said trigger condition associated with a call by the executing process to a service executable in, and belonging only to, a target container having a target namespace in a target pod:
interrupting, by the NSSM, said executed process when said trigger condition occurs as notified by the second kernel thread; and
moving, by the NSSM, said process into said target pod by switching said source namespace of said source container to said target namespace.

2. The method of claim 1, said source pod comprising said source container and one or more additional containers, said source container and said one or more additional containers sharing said source namespace.

3. The method of claim 1, said target pod comprising said target container and one or more additional containers, said target container and said one or more additional containers sharing said target namespace.

4. The method of claim 1, said trigger condition comprising entering a library routine of said process, said library routine linked to said service.

5. The method of claim 4, said library routine calling said service.

6. The method of claim 1, further comprising generating a configuration data file comprising an identification of said process, said one or more trigger conditions, said source namespace, and said target namespace.

7. The method of claim 6, said moving said process into said target pod based upon accessing said configuration data file.

8. The method of claim 1, further comprising:
generating a second trigger condition associated with said service; and
continuing said interrupted executed process in said source container having said target namespace.

9. The method of claim 8, further comprising:
when said second trigger condition occurs,
interrupting said continued executed process; and moving said process back into said source pod by switching said target namespace of said source container to said source namespace.

10. The method of claim 9, further comprising continuing said interrupted continued executed process in said source container having said source namespace.

11. The method of claim 8, said second trigger comprising exiting said service.

12. An operating system for sharing services, comprising:
an operating system kernel;
a source pod comprising a source container having a source namespace;
a target pod comprising a target container having a target namespace; and
a name space switch manager, NSSM,
said operating system kernel configured to:
configure said NSSM with one or more trigger conditions associated with a process executable in said source container, and
execute said process in said source container, and
said NSSM configured to:
configure a second kernel thread for notifying said NSSM when a trigger condition of said one or more trigger conditions occurs, said trigger condition associated with a call by the executing process to a service executable in, and belonging only to, said target container, and
interrupt said executed process when said trigger condition occurs, as notified by the second kernel thread, and
said NSSM further configured to:
move said process into said target pod by switching said source namespace of said source container to said target namespace.

13. The operating system of claim 12, said source pod comprising said source container and one or more additional containers, said source container and said one or more additional containers sharing said source namespace.

14. The operating system of claim 12, said target pod comprising said target container and one or more additional containers, said target container and said one or more additional containers sharing said target namespace.

15. The operating system of claim 12, said trigger condition comprising entering a library routine of said process, said library routine linked to said service.

16. The operating system of claim 15, said library routine configured to call said service.

17. The operating system of claim 12, said operating system kernel further configured to:
configure said NSSM with a configuration data file comprising an identification of said process, said one or more trigger conditions, said source namespace, and said target namespace.

18. The operating system of claim 17, said NSSM further configured to:
move said process into said target pod by accessing said configuration data file.

19. The operating system of claim 12,
said NSSM further configured to:
configure a third kernel thread for notifying said NSSM when a second trigger condition occurs, said second trigger condition associated with said service; and
allow operating system kernel to continue said interrupted executed process in said source container having said target namespace.

20. The operating system of claim 19,
said NSSM further configured to:
when said second trigger condition occurs,
interrupt said continued executed process; and
move said process back into said source pod by switching said target namespace of said source container to said source namespace.

21. The operating system of claim 20, said NSSM further configured to allow operating system kernel to continue said interrupted continued executed process in said source container having said source namespace.

22. The operating system of claim 19, said second trigger comprising exiting said service.

23. A computer program product for sharing services, the computer program product comprising a computer readable storage medium having program instructions embodied therewith, the program instructions executable by a processor to:
generate, by an operating system kernel, one or more trigger conditions associated with a process executable in a source container having a source namespace in a source pod;
configure, by the operating system kernel, a name space switch manager (NSSM) with the one or more trigger conditions;
execute said process in said source container; and
configure, by the NSSM, a second kernel thread for notifying the NSSM when a trigger condition of said one or more trigger conditions occurs, said trigger condition associated with a call by the executing process to a service executable in, and belonging only to, a target container having a target namespace in a target pod:
interrupt, by the NSSM, said executed process when said trigger condition occurs as notified by the second kernel thread; and
move, by the NSSM, said process into said target pod by switching said source namespace of said source container to said target namespace.

* * * * *